United States Patent [19]
Evans et al.

[11] Patent Number: 6,093,773
[45] Date of Patent: *Jul. 25, 2000

[54] POLYETHER AMINE MODIFICATION OF POLYPROPLENE

[75] Inventors: Randall Keith Evans, Houston; Richard Joseph Gilbert Dominguez; Richard James Clark, both of Austin, all of Tex.

[73] Assignee: Huntsman Petrochemical Corporation, Austin, Tex.

[*] Notice: This patent is subject to a terminal disclaimer.

[21] Appl. No.: 09/368,033

[22] Filed: Aug. 3, 1999

Related U.S. Application Data

[60] Continuation of application No. 08/962,785, Nov. 3, 1997, Pat. No. 5,942,576, which is a division of application No. 08/515,706, Aug. 16, 1995, Pat. No. 5,721,315, which is a continuation of application No. 08/222,508, Apr. 4, 1994, abandoned, which is a division of application No. 08/090,675, Jul. 13, 1993, abandoned.

[51] Int. Cl.$^7$ .................................................. C08L 51/06
[52] U.S. Cl. .............................. 525/73; 525/63; 525/69; 525/74; 525/78
[58] Field of Search ............................... 525/73, 78, 74, 525/63, 69

*Primary Examiner*—Mark L. Warzel
*Attorney, Agent, or Firm*—O'Keefe, Egan & Peterman LLP

[57] ABSTRACT

A compound comprising a blend of polypropylene with the reaction product of a functionalized polypropylene and polyether amine in which the polyether amine is grafted onto the functionalized polypropylene in a customary mixing apparatus is disclosed. A process for producing the reaction product of the functionalized polypropylene and the polyether amine by melting with polypropylene in a customary mixing apparatus is also disclosed.

30 Claims, No Drawings

POLYETHER AMINE MODIFICATION OF POLYPROPLENE

This application is a continuation of application Ser. No. 08/962,785, filed Nov. 3, 1997, now U.S. Pat. No. 5,942,756, which is a divisional of application Ser. No. 08/515,706, filed Aug. 16, 1995, now U.S. Pat. No. 5,721,315, which is a continuation of application Ser. No. 08/222,508, filed Apr. 4, 1994, now abandoned, which is a divisional of application Ser. No. 08/090,675, filed Jul. 13, 1993, now abandoned.

BACKGROUND OF THE INVENTION

1. Field of the Invention

This invention relates to a novel olefin polymer composed of the reaction product of a functionalized polypropylene and a polyetheramine. This invention also relates to thermoplastic resin blends containing the novel olefin polymer and polypropylene.

2. Related Art

The in-situ formation of compatibilizers for polyblends is rapidly gaining popularity. In the last few years, more and more cases have been reported where advantage is taken of the presence of reactive groups to form a graft or a block or a random copolymer, which could act as a compatabilizer for a mixture of two or more polymers. The prior art, *Process Requirements of the Reactive Compatibilization of Nylon 6/Polypropylene Blends* by S. S. Dagli, M. Xanthos and J. A. Biensenberger: Polymer Processing Institute at Stevens Institute of Technology, Hoboken, N.J. 07030 reveals an acrylic acid grafted modified polypropylene used with a blend of nylon-6 and polypropylene.

Thermoplastic resin compositions containing polypropylene are well known in the art (e.g. U.S. Pat. No. 5,208,081). U.S. Pat. No. 5,179,164 describes a polypropylene/polyamide composition suitable for producing moldings. The patent describes an ethylene copolymer useful as an adhesion promoter. Moreover, the patent indicates that maleic acid is a suitable monomer for preparing the ethylene copolymer.

In addition, maleated polypropylene is commercially available.

European patent application 0 367 832 discloses a resin composition containing an olefinic polymer having acid anhydride groups. As in U.S. Pat. No. 5,179,164, the novel compound is blended with a polyamide.

Japanese patent 46003838 reveals a maleic anhydride modified polypropylene composition containing triethylamine and polyethylene glycol nonylphenyl ether. Japanese patent 60195120 reveals a molding containing polyethylene, maleic anhydride-grafted polyethylene, and diethylenetriamine.

However, the instant invention uses the maleic anhydride in conjunction with polyetheramines which produce unexpected improvements in resin properties.

SUMMARY OF THE INVENTION

This invention is a compound comprising a blend of polypropylene with the reaction product of a functionalized polypropylene and polyether amine in which the polyether amine is grafted onto the functionalized polypropylene in a customery mixing apparatus. This invention is also a process for producing the reaction product of the functionalized polypropylene and the polyether amine by melting with polypropylene in a customery mixing apparatus.

DESCRIPTION OF THE PREFERRED EMBODIMENT

The blend of polypropylene with the reaction product of maleated polypropylene and polyether amine shows improved paintability, improved impact resistance, and excellent mold flowability over blends of polypropylene and the reaction product of polypropylene and maleated polypropylene.

Plastics are increasingly being employed in the production of motor vehicles. Impact-modified PP has proved to be particularly suitable for applications such as bumpers, spoilers, fenders, side bump strips and the like. Therefore, a thermoplastic resin blend having the improved properties of the instant invention has significant potential commercial usefulness.

These resin compositions, according to the present invention, are useful as engineering plastics which are materials for structural members in the fields of transport machines (automobiles, ships and the like), apparatus, tools, electronic appliances, electric appliances, sporting goods, leisure goods and the like; and for connectors, tubes and the like.

Suitable polypropylenes are known from polymer chemistry, are described for example in Kunststoff-Handbuch, volume IV, Polyolefine, edited by R. Vieweg, A. Schley and A. Schwarz. Carl Hanser Verlag, Munich, 1969, and are commercially available, so that no details need be given.

Functionalized PP is PP onto which a monomer has been grafted. The usual method of such grafting is by free radical reaction. Suitable monomers for preparing functionalized polypropylene are for example olefinically unsaturated monocarboxylic acids, e.g. acrylic acid or methacrylic acid, and the corresponding tert-butyl esters, e.g. tert-butyl (meth) acrylate, olefinically unsaturated dicarboxylic acids, e.g. fumaric acid, maleic acid, and itaconic acid and the corresponding mono- and/or di-tert-butyl esters, e.g. mono- or di-tert-butyl fumarate and mono- or di-tert-butyl maleate, olefinically unsaturated dicarboxylic anhydrides, e.g. maleic anhydride, sulfo- or sulfonyl-containing olefinically unsaturated monomers, e.g. p-styrenesulfonic acid, 2-(meth) acrylamido-2-methylpropenesulfonic acid or 2-sulfonyl-(meth)acrylate, oxazolinyl-containing olefinically unsaturated monomers, e.g. vinyloxazolines and vinyloxazoline derivatives, and epoxy-containing olefinically unsaturated monomers, e.g. glycidyl (meth)acrylate or allyl glycidyl ether.

Suitable maleated polypropylene include the following structures:

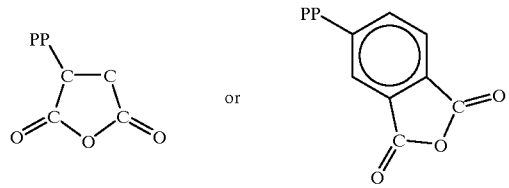

wherein PP is polypropylene.

Suitable polyether blocks for the polyetheramine include polyethylene glycol, polypropylene glycol, copolymers of polyethylene glycol and polypropylene glycol, poly(1,2-butylene glycol), and poly(tetramethylene glycol).

Suitable polyetheramines include monamines, diamines and triamines, having a molecular weight of from about 150 to 12,000. Suitable monamines include JEFFAMINE M-1000, JEFFAMINE M-2070, and JEFFAMINE M-2005. Suitable diamines include JEFFAMINE ED-6000, JEFFAMINE ED-4000, JEFFAMINE ED-2001, JEFFAMINE D-2000, JEFFAMINE D-4000, JEFFAMINE ED-900, JEFFAMINE ED-600, and JEFFAMINE D-400. Suitable triamines include JEFFAMINE ET-3000, JEFFAMINE T-3000 and JEFFAMINE T-5000.[1]

[1]See Glossary

The mixing of the functionalized polypropylene and polyetheramine may be carried out in a customary mixing apparatus including batch mixers, continuous mixers, kneaders, and extruders.

Besides the PP/functionalized-PP/polyetheramine structural components according to the invention, the resin composition may, to improve the impact strength, contain impact modifiers, advantageously impact-modifying elastomers. Impact-modifying elastomers for the instant invention are known to a skilled worker. Examples are rubbers based on ethylene, propylene, butadiene, and acrylates, e.g. methacrylates, or mixtures thereof.

Suitable impact-modifying elastomers are described for example in Methoden der organischen Chemie (Houben-Weyl), volume XIV/1, Makromolekulare Chemie (Georg-Thieme-Verlag, Stuttgart, 1961), pages 390 to 406, and in the monograph by C. B. Bucknal, Toughened Plastics (Applied Publishers, London, 1977).

In addition to the structural components of PP, functionalized-PP, and polyetheramine and any impact modifier contained in a resin composition according to the instant invention, the resin may also contain reinforcing agents and/or additives. The reinforcing agents used may be reinforcing fillers, for example asbestos, carbon or carbon fibers, clay, talc, mica, glass (beads or fibers), and chalk which may be finished with adhesion promoters and/or sizes.

The preferred functionalized polypropylene is a maleated polypropylene having the following structure:

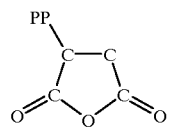

wherein PP is polypropylene.

The preferred monoamines as well as the preferred triamines have a molecular weight of from about 200 to 4000. The preferred diamines have a molecular weight of from about 148 to 6000.

The preferred reaction product between the preferred functionalized polypropylene, maleated polypropylene, and the preferred polyetheramine has the following formula:

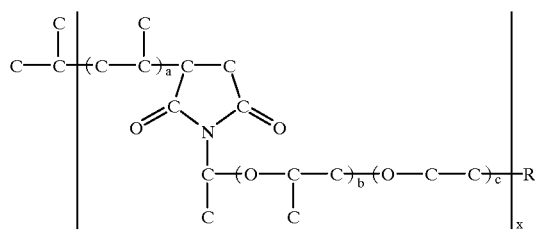

wherein a is from about 5 to 50,000, for b:c from about 0:100 to 100:0, x is from about 1 to 3, and R is an alkyl radical.

Suitable thermoplastic resin compositions may contain from about 66 to 80 wt % PP, from about 20 to 30 wt % maleated PP and from about 2 to 10 wt % polyetheramine.

The preferred customary mixing apparatus is an extruder in which the polyetheramine is grafted onto the maleated polypropylene at from about 175 to 300° C. in the course of a residence time of from about 25 to 300 seconds. Polypropylene is a non-reactive component of the mixing blend. The preferred temperature range is from about 190 to 260° C.

Continuous compounding was carried out in a Werner & Pfleiderer 30 mm twin screw extruder (ZSK30) in which the feed sequence was a combined feed in which all the components fed at the same location (hopper of the extruder).

The following examples which illustrate the nature of the instant invention are not intended to be limitative.

EXAMPLE 1–6

Blends of PP, maleated PP (MAL-PP), and JEFFAMINE M2070 produced in an extruder exhibit characteristics in percent compositions as shown in Table 1 in which the remaining percent is PP:

TABLE 1

| Example | 1 | 2 | 3 | 4 | 5 | 6 |
|---|---|---|---|---|---|---|
| % MAL-PP | | 20 | | | 30 | |
| % M2070 | 0 | 2 | 4 | 0 | 2 | 4 |
| FM, psi | 284K | 255K | 226K | 289K | 256K | 201K |
| StY, psi | 8660 | 7980 | 7030 | 8750 | 7830 | 6170 |
| TE, % | 8 | 16 | 10 | 4 | 13 | 5 |
| TSt, psi | 4990 | 4770 | 4280 | 5000 | 4630 | 3720 |
| NI, ftlb/in | 0.161 | 0.220 | 0.386 | 0.123 | 0.139 | 0.220 |
| UnI, ftlb/in | 12 | 14 | 10 | 10 | 14 | 5 | where:
FM - flexural modulus
StY - stress at yield
TE - Tensile elongation
TSt - tensile strength
NI - notched izod impact
UnI - unnotched izod impact.

EXAMPLES 7–10

Table 2 reveals the effects of JEFFAMINE M2070 (M) as compared to JEFFAMINE ED2001 (ED) in which either is blended with from about 76 to 78 wt % of PP, and from about 20 wt % of MAL-PP in an extruder.

TABLE 2

| Example | 7 | 8 | 9 | 10 |
|---|---|---|---|---|
| J. Type | M | ED | M | ED |
| % JEFF. | 2 | | 4 | |
| FM, psi | 255K | 246K | 226K | 230K |
| StY, psi | 7980 | 7730 | 7030 | 7140 |
| TE, % | 16 | 10 | 10 | 16 |
| TSt, psi | 4770 | 4560 | 4280 | 4420 |
| NI, ftlb/in | 14 | 15 | 10 | 18 |
| UnI, ftlb/in | 14 | 15 | 10 | 18 | where:
FM - flexural modulus
StY - stress at yield
Th - Tensile elongation
TSt - tensile strength
NI - notched izod impact
UnI - unnotched izod impact.

EXAMPLES 11–17

Table 3 reveals the percent paint adhesion of various compositions of PP, maleated PP, and the JEFFAMINES indicated relative to a control sample wherein the blends were produced in an extruder.

TABLE 3

| Example | PP | MAL-PP | % J. Type | Paint Adhesion | Control |
|---|---|---|---|---|---|
| 11 | 76% | 20% | 4% JEFFAMINE M1000 | 62% | 2% |
| 12 | 76% | 20% | 4% JEFFAMINE ED-6000 | 28% | 4% |
| 13 | 74% | 20% | 6% JEFFAMINE ED-6000 | 46% | 4% |
| 14 | 74% | 20% | 6% JEFFAMINE ED-4000 | 40% | 4% |
| 15 | 74% | 20% | 6% JEFFAMINE M-2070 | 77% | 21% |
| 16 | 72% | 20% | 8% JEFFAMINE M-2070 | 40% | 21% |
| 17 | 72% | 20% | 8% JEFFAMINE ED-2001 | 68% | 21% |

GLOSSARY

JEFFAMINE M-1000

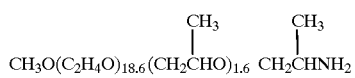

$$CH_3O(C_2H_4O)_{18.6}(CH_2CHO)_{1.6}CH_2CHNH_2$$
with $CH_3$ branches

JEFFAMINE M-2070 and JEFFAMINE M-2005

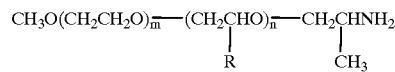

$$CH_3O(CH_2CH_2O)_{\overline{m}}(CH_2CHO)_{\overline{n}}CH_2CHNH_2$$
with R and $CH_3$ branches where R=H, $CH_3$, m is from about 3 to 32, and n is from about 10 to 32.

JEFFAMINE D-2000, JEFFAMINE D-4000 and JEFFAMINE D-400

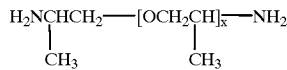

$$H_2NCHCH_2-[OCH_2CH]_x-NH_2$$
with $CH_3$ branches where x is about 33 for D-2000, x is about 68 for D-4000 and x is about 5.6 for D-400.

JEFFAMINE ED-600, JEFFAMINE ED-900, JEFFAMINE ED-2001, JEFFAMINE ED-4000, and JEFFAMINE ED-6000

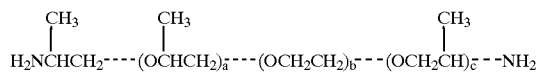

$$H_2NCHCH_2-(OCHCH_2)_a-(OCH_2CH_2)_b-(OCH_2CH)_c-NH_2$$
with $CH_3$ branches where b is about 8.5 and a+c is about 2.5 for ED-600, b is about 15.5 and a+c is about 2.5 for ED-900, b is about 40.5 and a+c is about 2.5 for ED-2001, b is about 86.0 and a+c is about 2.5 for ED-4000, and b is about 132.0 and a+c is about 3.0 for ED-6000.

JEFFAMINE T-3000 and JEFFAMINE T-5000

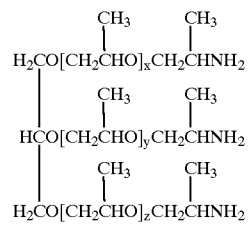

where x+y+z=50 for T-3000 and x+y+z=83 for T-5000.

JEFFAMINE ET-3000

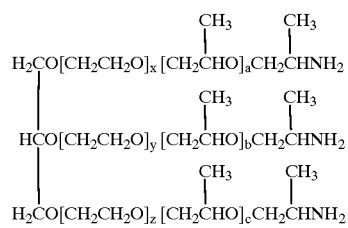

where x+y+z=57 and a+b+c=4.

We claim:

1. A compound comprised of polypropylene and the reaction product of a functionalized polypropylene and polyether amine.

2. The compound of claim 1 wherein the functionalized polypropylene is derived from the free radical reaction of polypropylene and an olefinically unsaturated carboxylic acid.

3. The compound of claim 2 wherein the olefinically unsaturated carboxylic acid is a monocarboxylic acid comprised of acrylic acid or methacrylic acid, and the corresponding esters.

4. The compound of claim 2 wherein the olefinically unsaturated carboxylic acid is a dicarboxylic acid selected from the group consisting of fumaric acid, maleic acid, and itaconic acid.

5. The compound of claim 1 wherein the functionalized polypropylene is derived from the reaction of polypropylene and mono- and/or di- esters of olefinically unsaturated dicarboxylic acids comprising mono- or di- fumarate and mono- or di- maleate.

6. The compound of claim 1 wherein the functionalized polypropylene is derived from the reaction of polypropylene and an olefinically unsaturated carboxylic anhydride.

7. The compound of claim 1 wherein the functionalized polypropylene is derived from the reaction of polypropylene and sulfo- or sulfonyl-containing olefinically unsaturated monomers comprising p-styrenesulfonic acid, 2-(meth)acrylamido-2-methylpropenesulfonic acid and 2-sulfonyl-(meth)acrylate.

8. The compound of claim 1 wherein the functionalized polypropylene is derived from the reaction of polypropylene and oxazolinyl-containing olefinically unsaturated monomers comprising vinyloxazolines and vinyloxazoline derivatives.

9. The compound of claim 1 wherein the functionalized polypropylene is derived from the reaction of polypropylene and epoxy-containing olefinically unsaturated monomers, selected from the group comprising glycidyl (meth)acrylate and allyl glycidyl ether.

10. The compound of claim 1 wherein the polyether amine is selected from the group consisting of monoamines, diamines and triamines and has a molecular weight of from about 148 to 12,000.

11. A compound comprised of polypropylene and the reaction product of maleated polypropylene and polyether amine.

12. The compound of claim 11 wherein the reaction product of maleated polypropylene and the polyether amine has the fromula:

[Structure: polymer with maleated/succinimide group attached to polyether chain]

$$\begin{array}{c} \text{structure showing polymer backbone with } (C-C)_a \text{ segment, succinimide ring with N, connected to } -C-(O-C-C)_b-(O-C-C)_c-R \text{ with } x \text{ repeat} \end{array}$$

wherein a is from about 5 to 50,000, for b:c from about 0:100 to 100:0, x is from about 1 to 3, and R is an alkyl radical.

13. The compound of claim 11 wherein the maleated polypropylene is selected from the group consisting of the structures having the formulae wherein PP is polypropylene:

[Structures: PP-substituted succinic anhydride and PP-substituted phthalic anhydride]

14. The compound of claim 11 wherein the polyether block is selected from the group consisting of polyethylene glycol, polypropylene glycol and copolymers of polyethylene glycol and polypropylene glycol.

15. The compound of claim 11 comprised of
a) from 70 to 80 wt % of polypropylene
b) from 20 to 30 wt % of maleated polypropylene
c) from 2 to 10 wt % of polyetheramine.

16. The compound of claim 15 wherein the polyetheramine has the following structure:

$$CH_3O(CH_2CH_2O)_{\overline{m}}(CH_2CHO)_{\overline{n}}-CH_2CHNH_2$$
with R and $CH_3$ substituents where R=H, $CH_3$, m is from about 3 to 32, and n is from about 10 to 32.

17. The compound of claim 15 wherein the polyetheramine has the following structures:

$$H_2NCHCH_2---(OCHCH_2)_{\overline{a}}---(OCH_2CH_2)_{\overline{b}}---(OCH_2CH)_{\overline{c}}---NH_2$$
with $CH_3$ substituents where b is about 40.5 and a+c is about 2.5, b is about 86.0 and a+c is about 2.5, and b is about 132.0 and a+c is about 3.0.

18. The compound of claim 15 wherein the polyetheramine has the following formula:

$$CH_3O(C_2H_4O)_{18.6}(CH_2CHO)_{1.6}\ CH_2CHNH_2$$
with $CH_3$ substituents

19. The compound of claim 11 wherein the polyether amine is selected from the group consisting of monoamines, diamines and triamines and has a molecular weight of from about 148 to 12,000.

20. The compound of claim 19 wherein the polyether amine is a monoamine selected from the group having a molecular weight from about 200 to 4000.

21. The compound of claim 20 wherein the monoamine has the following structure:

$$CH_3O(C_2H_4O)_{18.6}(CH_2CHO)_{1.6}\ CH_2CHNH_2$$
with $CH_3$ substituents

22. The compound of claim 20 wherein the monoamine has the following structure:

$$CH_3O(CH_2CH_2O)_{\overline{m}}-(CH_2CHO)_{\overline{n}}-CH_2CHNH_2$$
with R and $CH_3$ substituents where R=H, $CH_3$, m is from about 3 to 32, and n is from about 10 to 32.

23. The compound of claim 19 wherein the polyether amine is a diamine selected from the group having a molecular weight of from about 148 to 6000.

24. The compound of claim 23 wherein the diamine is selected from the group consisting of compounds of the following structure:

$$H_2NCHCH_2---(OCHCH_2)_{\overline{a}}---(OCH_2CH_2)_{\overline{b}}---(OCH_2CH)_{\overline{c}}---NH_2$$
with $CH_3$ substituents where b is about 8.5 and a+c is about 2.5, b is about 15.5 and a+c is about 2.5, b is about 40.5 and a+c is about 2.5, b is about 86.0 and a+c is about 2.5, and b is about 132.0 and a+c is about 3.0.

25. The compound of claim 23 wherein the diamine is selected from the group consisting of compounds of the following structure:

$$H_2NCHCH_2-[OCH_2CH]_{\overline{x}}-NH_2$$
with $CH_3$ substituents where x is about 33, x is about 68, and x is about 5.6.

26. The compound of claim 19 wherein the polyether amine is a triamine having the molecular weight of from about 200 to 4000.

27. The compound of claim 26 wherein the triamine is selected from the group consisting of compounds having the following structure:

$$H_2CO[CH_2CHO]_x CH_2CHNH_2$$
$$HCO[CH_2CHO]_y CH_2CHNH_2$$
$$H_2CO[CH_2CHO]_z CH_2CHNH_2$$
with $CH_3$ substituents where x+y+z=50 and x+y+z=83.

28. The compound of claim 26 wherein the triamine has the following structure:

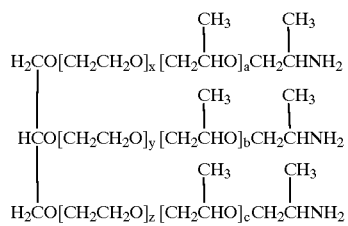

where x+y+z=57 and a+b+c=4.

29. A process for producing the reaction product of a maleated polypropylene and a polyetheramine wherein the polyetheramine is grafted onto the maleated polypropylene in the presence of polypropylene by melting the components in a customary mixing apparatus at a temperature of from about 175 to 300° C. in the course of a residence time of from about 25 to 300 seconds.

30. The process of claim 29 wherein the reaction is carried out from about 190 to 260° C. in an extruder.

* * * * *